(12) United States Patent
White

(10) Patent No.: US 7,652,210 B2
(45) Date of Patent: Jan. 26, 2010

(54) PROTECTIVE ELECTRICAL OUTLET COVER HAVING INTEGRATED POSITIVE LOCKING MECHANISM

(75) Inventor: Patrick M. White, West Chester, PA (US)

(73) Assignee: Socket-Lockits, Inc., West Chester, PA (US)

( * ) Notice: Subject to any disclaimer, the term of this patent is extended or adjusted under 35 U.S.C. 154(b) by 0 days.

(21) Appl. No.: 12/140,315

(22) Filed: Jun. 17, 2008

(65) Prior Publication Data

US 2009/0008123 A1    Jan. 8, 2009

Related U.S. Application Data

(60) Provisional application No. 60/937,959, filed on Jul. 2, 2007.

(51) Int. Cl.
*H02G 3/14*   (2006.01)
(52) U.S. Cl. .............. 174/67; 174/66; 174/53; 220/241; 439/137; 33/528
(58) Field of Classification Search ............. 174/66, 174/67, 53; 220/241, 242; 439/136, 149, 439/106, 652, 528, 137, 143, 145; 33/528
See application file for complete search history.

(56) References Cited

U.S. PATENT DOCUMENTS 2,058,292 A * 10/1936 Benander ............ 439/652

| | | |
|---|---|---|
| 3,989,334 A | 11/1976 | Fortino |
| 4,302,624 A | 11/1981 | Newman |
| 4,426,121 A | 1/1984 | Stoewe et al. |
| 4,435,032 A | 3/1984 | Abramson |
| 5,024,603 A | 6/1991 | Hsieh |
| 5,082,450 A * | 1/1992 | Warren et al. ........... 439/102 |
| 5,320,542 A | 6/1994 | Cheng |
| 5,480,318 A * | 1/1996 | Garrison ............... 439/346 |
| 5,691,507 A | 11/1997 | Wei |
| 5,947,755 A | 9/1999 | Conway |
| 6,674,003 B1 | 1/2004 | Torres |
| 6,699,050 B1 | 3/2004 | Wong et al. |
| 6,703,562 B1 * | 3/2004 | Pacheco ................. 174/66 |
| 6,794,575 B1 | 9/2004 | McBain et al. |
| 7,005,580 B1 | 2/2006 | Craig |
| 7,045,708 B2 | 5/2006 | Miura et al. |
| 7,070,426 B2 | 7/2006 | DeCell, Jr. et al. |

* cited by examiner

*Primary Examiner*—Dhiru R Patel
(74) *Attorney, Agent, or Firm*—Dennis M. Carleton; Fox Rothschild LLP

(57) ABSTRACT

A safety device for electrical outlets includes a body having prongs rigidly attached to the body which can be inserted into the openings of a standard electrical outlet, wherein one or more of the prongs define a spring-biased portion defining a barb for engaging the rear surface of the outlet once the device is fully inserted therein.

22 Claims, 9 Drawing Sheets

PROTECTIVE ELECTRICAL OUTLET COVER HAVING INTEGRATED POSITIVE LOCKING MECHANISM

RELATED APPLICATIONS

This application claims the benefit of U.S. Provisional Application Ser. No. 60/937,959, filed Jun. 29, 2007, entitled "Electrical Outlet Protection Device".

BACKGROUND OF THE INVENTION

It is generally well known in the art to cover electrical outlets with protective outlet covers to prevent unwanted tampering, especially by babies and young children, and, for outdoor outlets, for purposes of weatherproofing the outlet.

The outdoor cover designs include box shaped structures surrounding the outlet or cover plate implementations, which are offered with a variety of miniature spring-loaded doors covering the individual sockets. The miniature doors are provided so that they slide or pivot out of the way to accommodate an electrical cord to be plugged into the outlet.

The same concept of a cover plate has been extended into the interior of the home as a child safety device. Installation of the device, most often requires the removal of the existing outlet plate and its replacement with one having an integrated protective device. These types of covers tend to be expensive since they are manufactured as a series of assembled components and require removal and discard of the existing outlet plate.

For interior outlets there are also products that work with the individual sockets in an outlet. Many of these designs consist of a cover and some type of prongs for engaging and holding the plug into the outlet. These prongs are typically sized to work like the prongs on an electrical plug and engage the electrical contacts inside the outlet to hold the cover in place. These are very well known in the art and consist mainly of a plastic faceplate in the shape of an outlet, having two plastic prongs extending therefrom which are designed to engage the outlet in the two rectangular slots.

Although the use of these types of safety devices do not require the replacement of the existing outlet plate, they only rely on the application of force in one direction for removal. Further, these types of safety devices do not have a positive locking feature. Therefore, once a child understands how to pull on them, they tend to remove them out of curiosity, thereby attracting them to the very thing they are being guarded from. Because these types of cover plugs are easy to remove, and lack a positive locking feature, they have traditionally been manufactured in material and shapes that do not suggest to children that they are objects of attention.

Other designs have improved on this idea and have provided more complicated devices. One such design is shown in U.S. Pat. No. 6,699,050 to Wong, et al., in which a barbed, spring-loaded prong engages the ground hole of the outlet. The prong and the sliding mechanism are encased in a protective plastic housing that covers the remaining slots in the outlet when the device is in place. Another design is shown in U.S. Pat. No. 5,024,603, which discloses a device having barbed prongs and a locking mechanism. Both of these designs, however, suffer from the disadvantage of being relatively complicated and comprise multiple parts, requiring assembly, making them relatively expensive to manufacture.

Therefore there is a need to have an outlet protection device that does not require the removal of an existing outlet plate due to the expensive nature of the cost of removal and replacement.

There is also a further need for an outlet protection device that can be manufactured as a single component to reduce the cost of manufacture.

In addition, it is desirable to have an outlet protection device that requires force to be applied simultaneously in two different directions to increase the complexity of removal of the device from the outlet. Similarly, it is desirable to have an outlet protection device that includes a positive safety lock not allowing the device to be removed without some type of activation force.

Lastly, it is desirable to have an outlet protection device which can be manufactured with colors or designs, which are attractive and decorative while still maintaining their safe utility.

SUMMARY OF THE INVENTION

The present invention is directed to an outlet protection device with a cover for protecting an electrical socket that is inexpensive to manufacture, easy to use, and which provides a positive locking mechanism, requiring force to be applied simultaneously in at least two directions for removal.

In one embodiment of the invention, the cover has at least one prong for engaging the opening of the electrical socket and a reverse tongue defined within the prong having a barb disposed thereon for positively engaging the rear surface of either rectangular opening of the socket. Unlike other safety covers, the flexible tongue defined in the prong carrying the barb acts as a catch on the back of the socket opening. After engaging the socket, any attempt to remove the cover without displacing the barbed tongue is averted by the barb, which engages with more strength against the back of the socket as it is pulled from the outlet, thereby acting as a self-reinforced locking mechanism.

The device is contemplated to work with one or two rectangular prongs present. In embodiments with two rectangular prongs, the barbed tongue may be present on one or both of the prongs. In addition, a rounded prong for engaging the ground opening may be present on the device as well, although it is not contemplated that the rounded prong would act as part of the locking mechanism.

During insertion of the device, the prong will engage the contacts inside the socket similar to the prong on an electrical device. The barb, having a reverse, ramped shape, upon contacting the front of the socket opening, deflects in relationship to the prong due to compression of the spring mechanism, allowing the barb to pass though the rectangular opening of the outlet at the same time as the prong. Once the device is fully inserted into the electrical outlet, the spring mechanism is allowed to rebound, causing the straight edge of the barb to engage the rear surface of the socket.

To release the barb and remove the device from the outlet, the spring mechanism must be compressed such that the barb no longer contacts the rear surface of the socket. In some embodiments, the spring mechanism has a release tab extending through the cover of the device such that the tab can be depressed from the outside of the cover, thereby releasing the barb. Alternatively, the cover may require the insertion of an object in an opening defined in the cover to release the barbed tongue. Other means of releasing the barb are also contemplated.

Removal of the cover requires the tongue to be deflected at the same time a pulling force is exerted on the cover. This dual activation makes it significantly more complicated for children to figure out the release process, making it more likely that the devices will not be removed the children.

In an alternate, and likely preferred embodiment of the invention, the prong itself is a "U"-shaped structure having a barb defined on one leg of the "U" and a tab defined on the end of the leg of the "U" on which the barb is defined. The tab extends from the back of the cover and allows the deflection of the leg of the "U" carrying the barb for removal of the device.

Normally, such devices would be colored as blandly as possible to blend in with the socket, to avoid attracting the attention of children to the device. However, due to the fact that there is a positive lock mechanism on the device of the present invention, the covers may also be decorative. In the preferred embodiment of the invention the device may be provided with a decorative cover. The cover can be in the shape of all kinds of decorative objects, such as animals, racecars, stars and sea creatures. The shapes can be two-dimensional silhouettes or three-dimensional and can be printed or colored to display pictures or printed or colored images.

The above and other features of the invention including various novel details of construction and combinations of parts, and other advantages, are more particularly described below with reference to the accompanying drawings. The drawings are not necessarily to scale, the emphasis instead being placed upon illustrating the principles of the invention.

DETAILED DESCRIPTION

Figure 1:
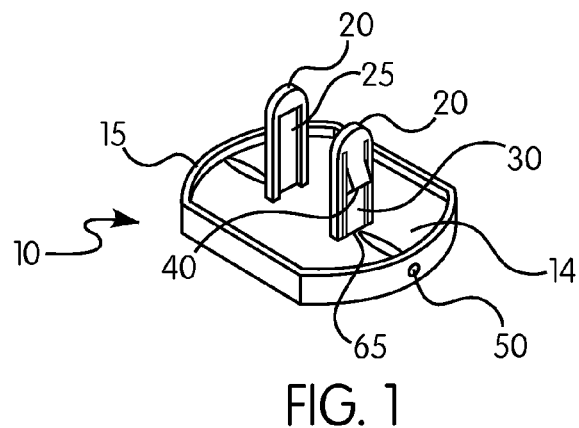
FIG. 1 is a perspective view of a first embodiment of the invention, showing an electrical outlet protection device having two prongs with barbed tongues.
Figure 2:
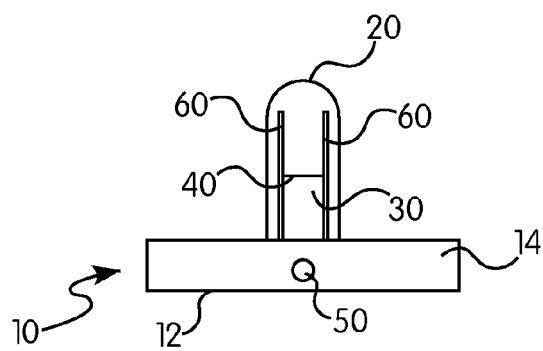
FIG. 2 is a side view of the device of FIG. 1.
Figure 3:
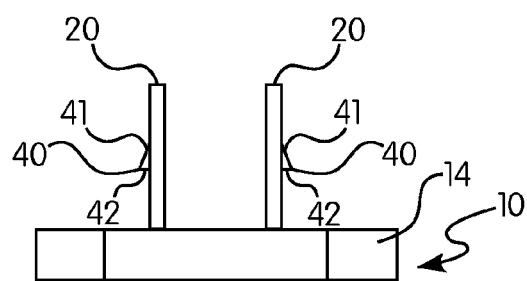
FIG. 3 is a front view of the device of FIG. 1.
Figure 4:
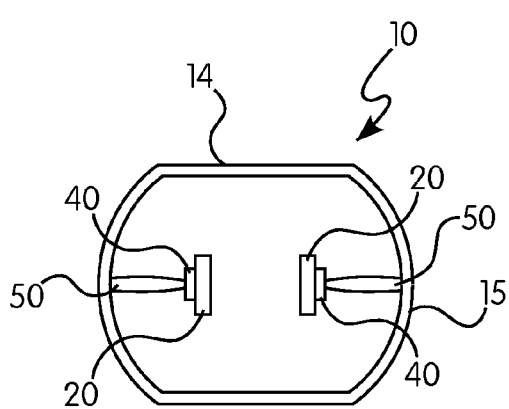
FIG. 4 is a top view of the device of FIG. 1.

The devices of the present invention are meant to be used with standard electrical outlets or sockets which are well known in the art and which are commonly found in residences and businesses. The use of the term "outlet" herein is meant to include all well-known design variations on electrical sockets commonly in use in the United States. It is also contemplated that the devices could be used in foreign countries merely by altering the shape of the prongs of the device, without deviating from the spirit of the invention FIGS. 1-4 show a first embodiment of the protective cover 10 of the present invention. Protective cover 10 has main body 14 having front face 12 and defining rim 15 around the rear perimeter thereof. Main body 14 has two prongs 20 extending from the rear surface thereof, each of prongs 20 is a generally rectangular shape structure defining a reverse tongue 30 with barbs 40. Reverse tongues 30 are relieved from prongs 20 on either side with slits 60 and on the lower end thereof with slit 65. Tongue 30 is also relieved on the inside surface 25, having a thinner cross sectional area than the remainder of prong 20, to allow barbs 40 to deflect within the width of prong 20 while being inserted into an electrical outlet.

Ramped surfaces 41 on one side of barbs 40 cause the deflection of tongue 30 during insertion of the device, and allows barbs 40 to fit within the width of the rectangular openings on the outlet. When prongs 20 have been fully inserted into a typical electrical outlet, tongues 40 will rebound to their original position, allowing the flat surface 42 defined on the opposite side of barb 40 to catch on the rear surface of the outlet, thereby holding the device in place within the outlet until released.

Removal of protective cover 10 requires that tongues 30 be deflected inward, such that barbs 40 disengage from the rear surface of the outlet. To release barbs 40, tongues 30 may be accessed through rim 15 using access holes 50 defined in rim 15. Cover 10 could be configured such that external object is required to be inserted into holes 50 for removal of the device.

Figure 5:
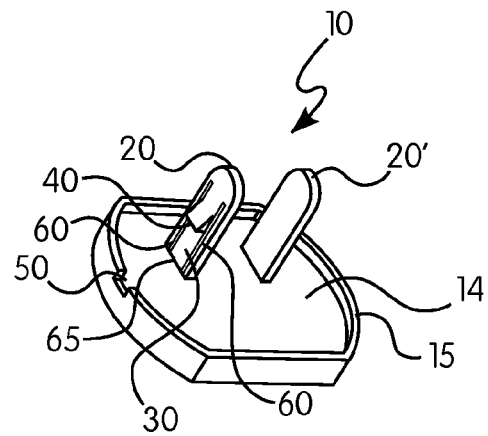
FIG. 5 is a left perspective view of a second embodiment of the invention, showing a version of the device having only one prong with a barbed tongue.

Variations of the first embodiment of the invention include protective covers having two prongs 20 and 20', wherein only one prong 20 is configured with tongue 30 and barb 40, while the other of prongs 20' is solid. This configuration is shown in FIG. 5. Other variations, not explicitly shown in the drawings, but nonetheless contemplated to be within the scope of the invention include covers having only one prong, covers having a prong shaped to fit within the ground hole of the outlet, and any combination of prongs and tongued prongs. An additional variation will have one smaller prong and one larger prong to accommodate polarized outlets having two different sized rectangular openings.

Figure 6:
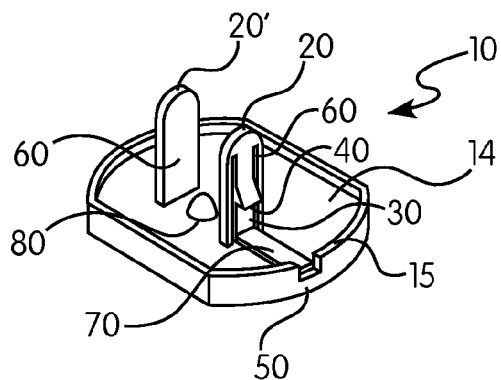
FIG. 6 is a right perspective view of a third embodiment of the invention, showing an electrical outlet cover of FIG. 5 having a release mechanism.
Figure 7:
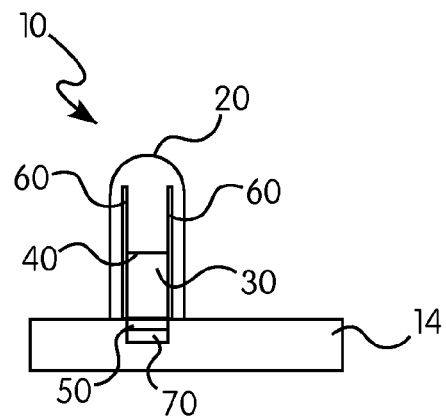
FIG. 7 is a side view of the device of FIG. 6.
Figure 8:
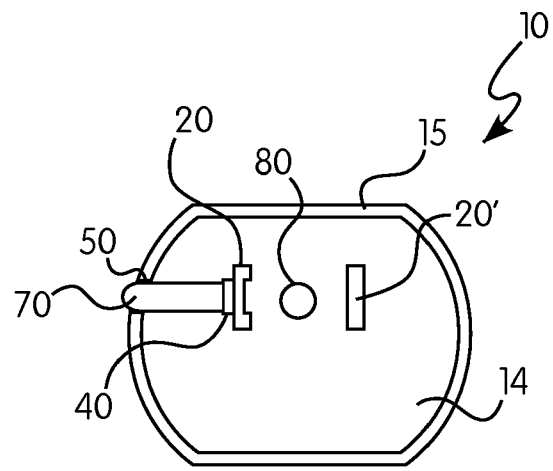
FIG. 8 is a top view of the device of FIG. 6.

FIGS. 6-8 show a second embodiment of the invention. In many aspects, this embodiment is essentially identical to the embodiment shown in FIG. 1. The main difference is the presence of tab 70 that protrudes through or is accessible through opening 50 defined in rim 15. Tab 70 may be pressed from the outside of protective cover 10 to disengage barb 40 from the rear surface of the outlet. Tab 70 may protrude slightly through rim 15, or may be slightly recessed within the rim. Note that, for tab 70 to work properly, tab 70 must be able to slide freely back and forth, and must therefore remain offset from the outlet. Post 80, located between prongs 20 and 20' serves to keep the body of device 10 from pressing tab 70 into the surface of the outlet.

As with the embodiments shown in FIGS. 1-5, all variations as discussed above with respect to the embodiment of FIGS. 1-5 are contemplated to be applicable to this embodiment as well.

Figure 9:
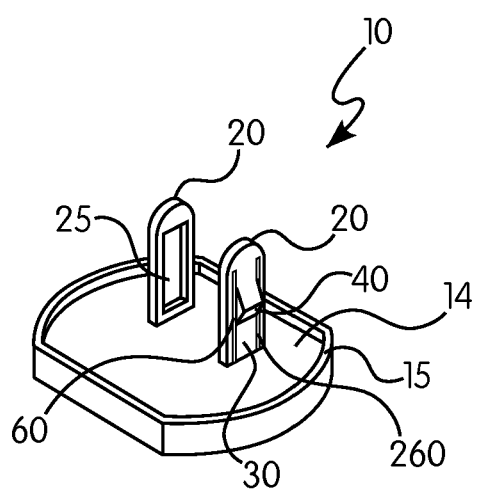
FIG. 9 is a perspective view of a fourth embodiment of the invention, showing a version of the device with a bridged tongue having a two-sided barb.
Figure 10:
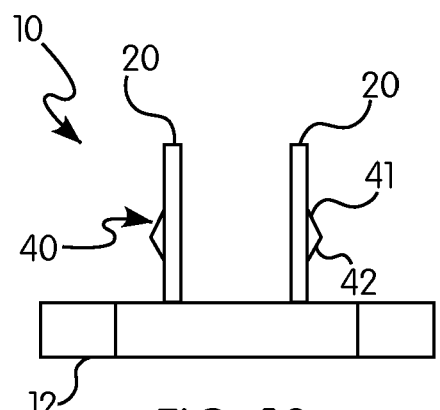
FIG. 10 is a side view of the embodiment of FIG. 9.

FIGS. 9-10 shows a third embodiment of the invention in which protective cover 10 is configured with barbs 40 having a slightly different shape than those of previous embodiments. In this embodiment, rim 15 has no openings, as tongues 40 need not be deflected using external means to effect removal of the device. Instead, in this embodiment, barbs 40 have two ramped surfaces 41 and 42, and tongues 30 are only relieved from prongs 20 on their sides by slots 60. Additional slot 65 is not present on the bottom of tongues 30, as with other embodiments. To remove protective cover 10 having this design, additional pulling force is required, as tongue 30 will be more difficult to deflect. Ramped edge 42 defined on barb 40 will deflect tongue 30 inwardly until barb 40 is released from the rear surface of the outlet.

Variations on this embodiment (not shown) are similar to those for the embodiments shown in FIGS. 1-8, including having only one prong 20 having a tongue 30 define therein and one solid prong 20'. In addition, a prong shaped to engage the ground hole of the outlet may also be provided.

Figure 11:
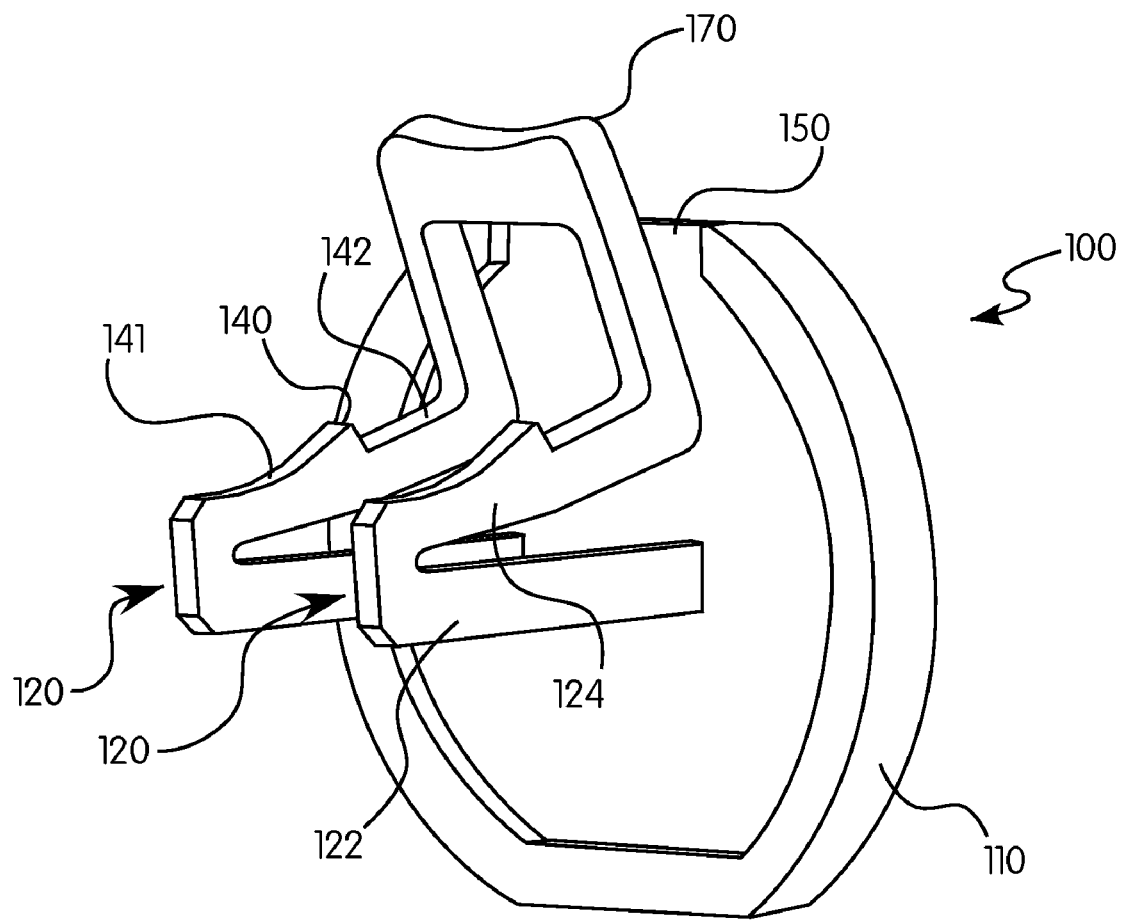
FIG. 11 is a perspective view of a fifth, and preferred embodiment of the electrical outlet protection device having an integrated spring clip mechanism.
Figure 12:
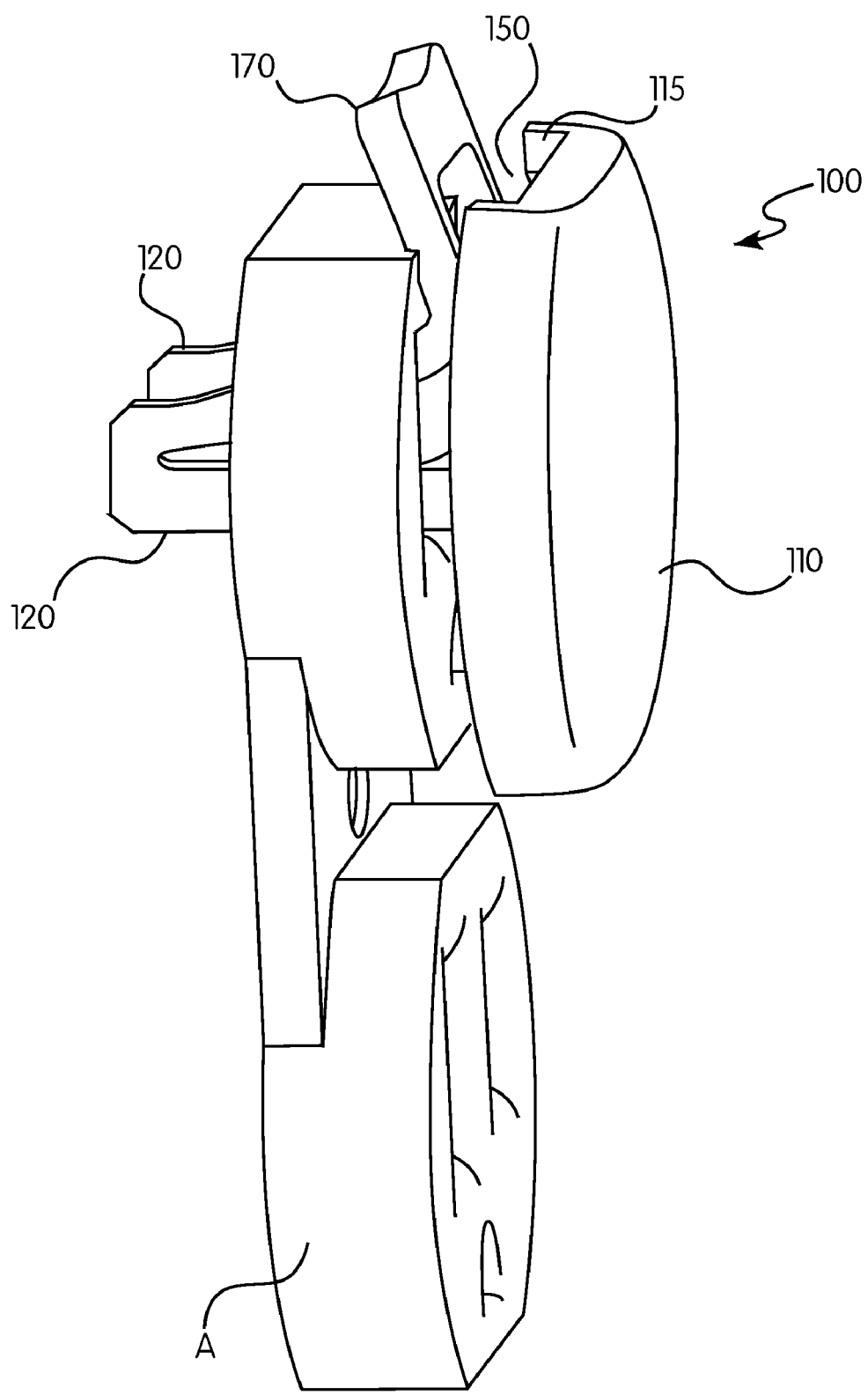
FIG. 12 is an in situ view of the device of FIG. 11 engaged in an electrical outlet.
Figure 13:
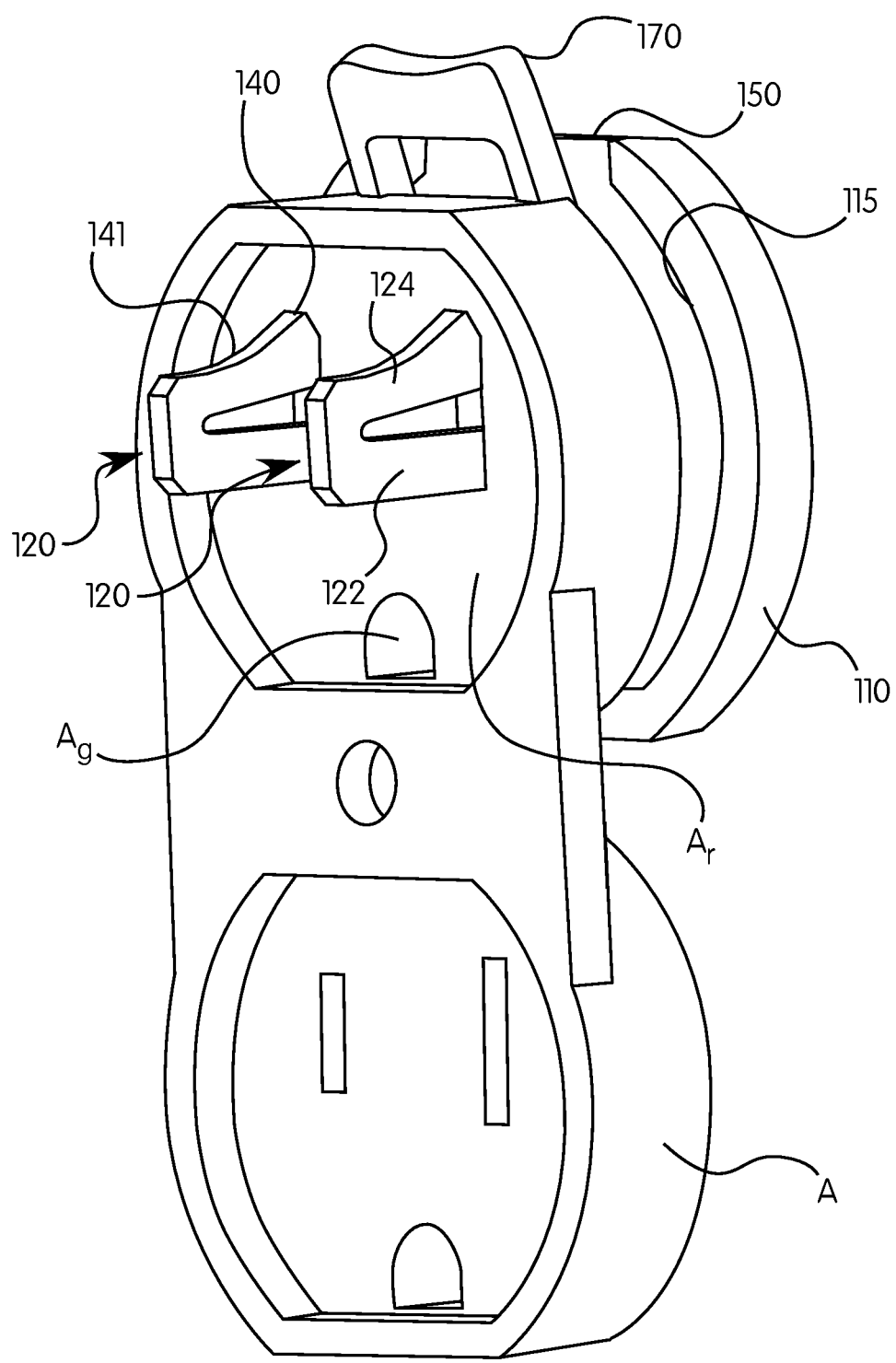
FIG. 13 is an in situ view of the device of FIG. 11 showing the rear of an electrical socket with the device engaged therein.

FIGS. 11-13 show a fourth and preferred embodiment of the invention. The device of this embodiment includes body 110 defining rim 115 on the rear perimeter thereof. Extending from body 110 are two structures 120, both being generally U-shaped and consisting of a first leg 122 and a second leg 124. Structure 120 is sized to fit into the rectangular openings of a typical electrical outlet and is rigidly connected to body 110 via first leg 122. Second leg 124 acts as a spring with respect to first leg 122. Second leg 124 defines a barb 140 thereon having a ramped surface 141 on one side and straight edge defining one side of recessed area 142 on the opposite side. Tab 170 connects ends of legs 124 and when pressed downwardly upon compresses the spring formed by legs 124 of structures 120, effecting release of the device from the electrical outlet.

FIGS. 12 and 13 shows protective cover 110 in situ in an electrical outlet, labeled A in the drawing. Note that outlet A is not considered to be part of the invention but is shown in the drawings solely for the purpose of showing device 110 in operation.

FIG. 13 show the rear of electrical outlet A having device 110 engaged therein. As can be seen, as device 110 is inserted into socket, a downward force is generate on leg 124 through the contact of ramp 141 with the top of the rectangular opening in outlet A. The force exerted on the ramp portion 141 of leg 124 of each of prongs 120 causes legs 124 to deflect downwardly allowing clearance for barbs 140 to enter the socket. Once barbs 140 clear the rear surface of electrical outlet A labeled $A_R$ in the drawing, legs 124 are relieved and spring upwardly, engaging barb 140 on the rear surface $A_R$ of outlet A. The body of outlet A rests within recess 142 when protective device 100 is engaged therein.

Tab 170 is accessible from outside of outlet A and extends through slot 150 defined in rim 115 of device 100. To remove device 100 from the electrical socket, tab 170 is pressed downward which causes legs 124 to deflect downward toward legs 122 until the tips of barbs 140 clear the tops of rectangular openings defined in outlet A and the device is able to be pulled out of outlet A.

As with other embodiments of the invention, the invention is meant to encompass various variations on this design including ones where one solid prong is provided and one prong is as shown in FIGS. 11-13. In such a case, tab 170 would not extend across both prongs 120 but instead would be connected singularly to the prong having a barb and spring defined thereon. In addition, a variation is contemplated having a third prong shaped to engage the ground hole $A_g$ of outlet A. In an additional variation, to accommodate the difference in the rectangular openings in a polarized outlet as shown in the bottom of outlet A in FIG. 13, structures 120, whether they be solid prongs or spring structures having barbs defined thereon may be of different sizes to accommodate the one larger and one smaller rectangular openings.

In another variation of this embodiment (not shown), it may be possible to utilize a barb having ramps on both sides thereof, as discussed with respect to the embodiment of the invention shown in FIGS. 9-10. In such a case, tab 170 may be eliminated, and the ends of legs 124 may also be rigidly attached to body 100. It may be necessary, in such cases that leg 124 be thinner in cross sectional area than leg 122, to provide a spring-like effect in leg 124 without movement of leg 122.

Figure 14:
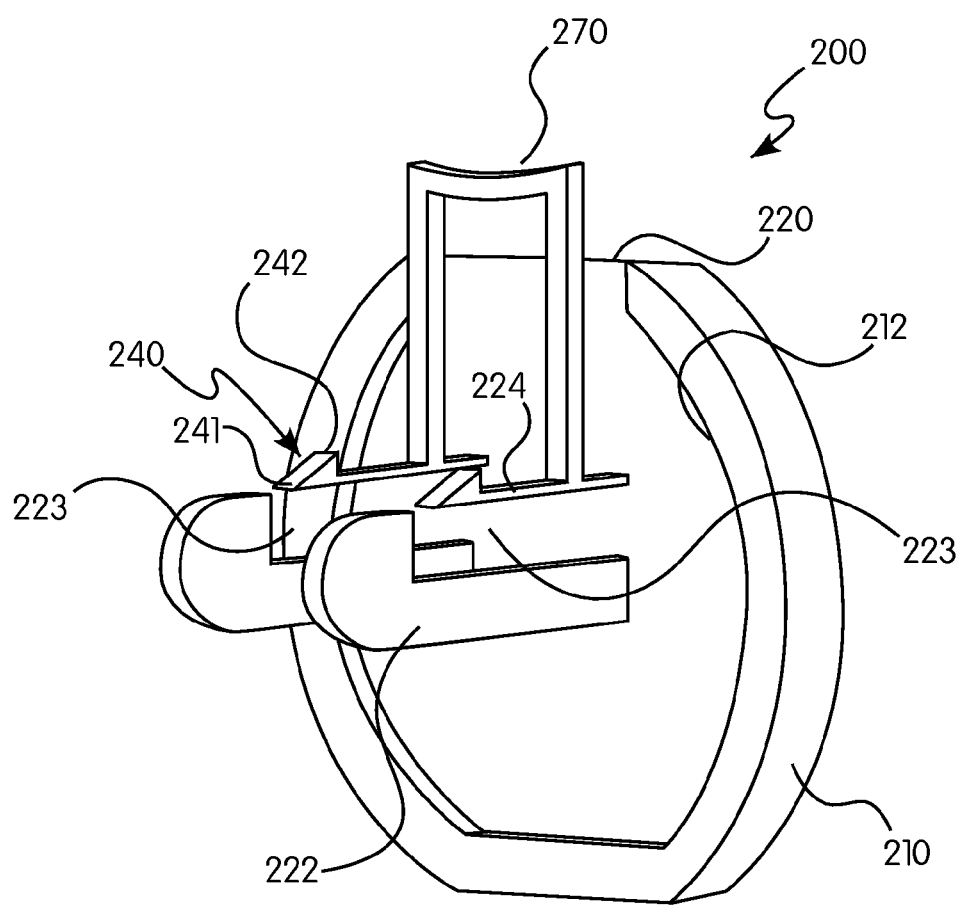
FIG. 14 is a perspective view of a sixth embodiment of the invention, showing an electrical outlet protection device having an integrated spring clip mechanism of a different design than that of the device of FIG. 11.
Figure 15:
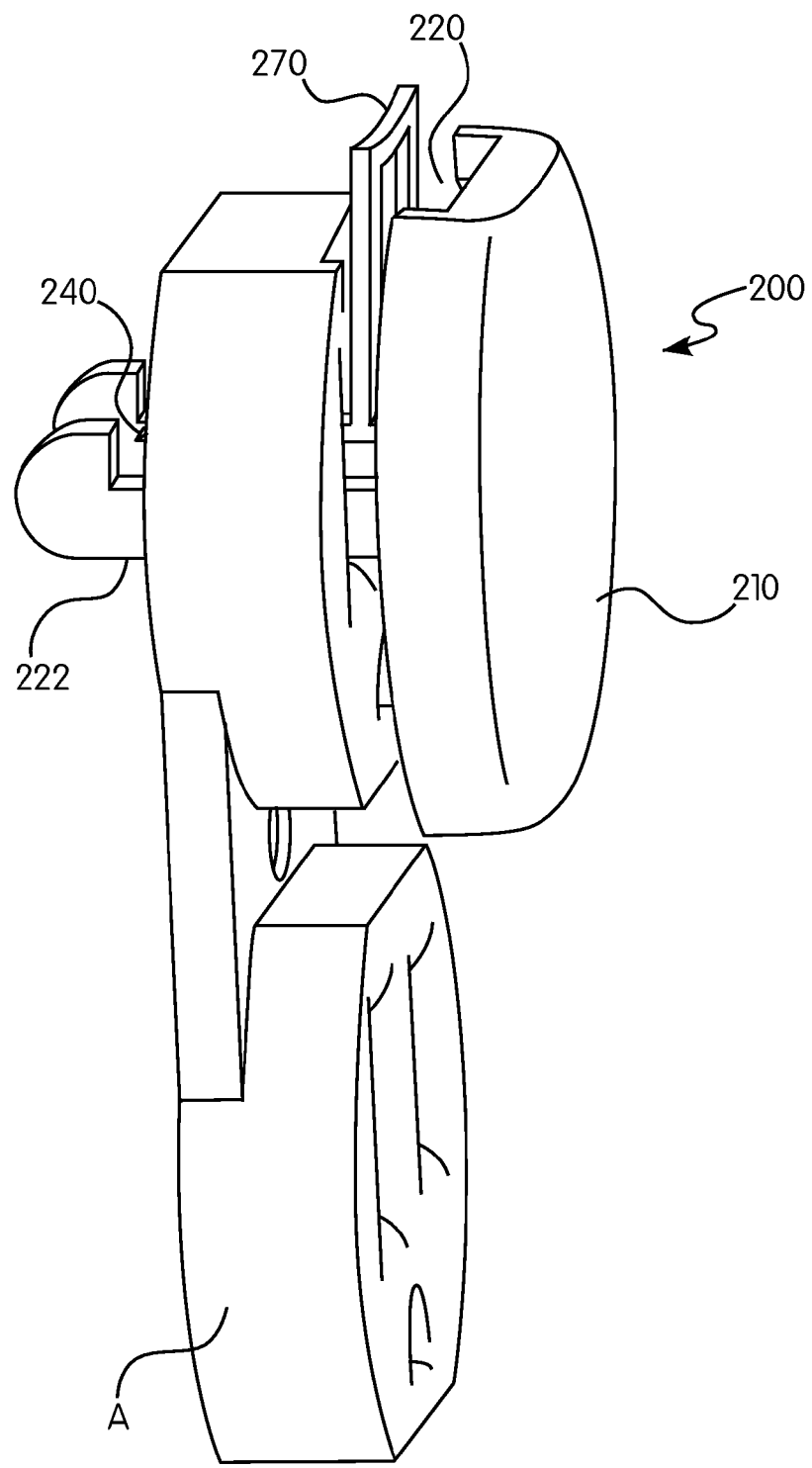
FIG. 15 is an in situ is a view of the device of FIG. 14 engaged in an electrical outlet.
Figure 16:
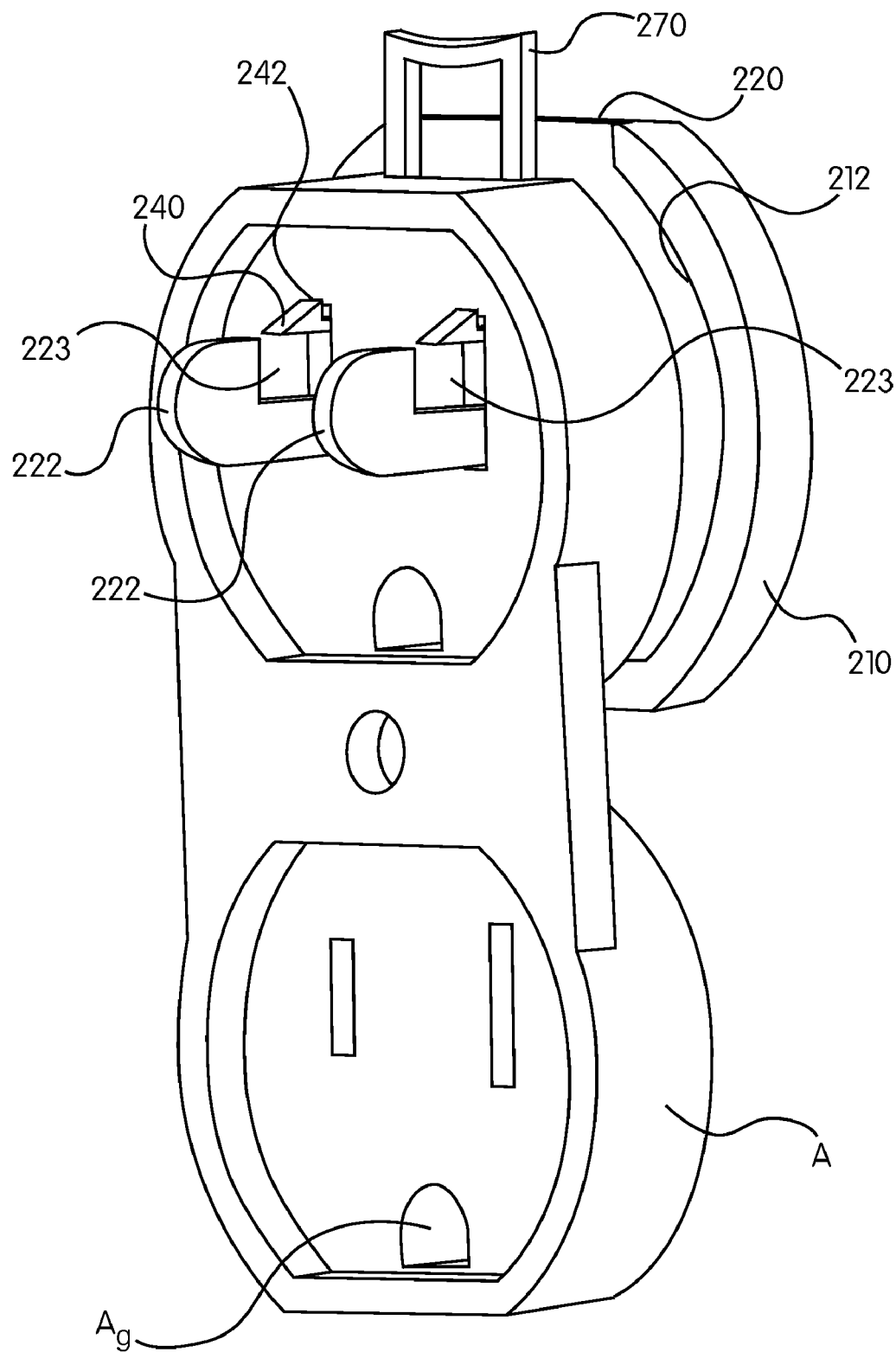
FIG. 16 is an in situ view of the device of FIG. 14 showing the rear of an electrical socket with the device engaged therein.

FIGS. 14, 15 and 16 show an addition embodiment of the invention. In this embodiment, similar to the embodiment in FIGS. 11-13, one or both rectangular prongs 222 are defined attached rigidly to body 210 of device 200, with the prongs defining recessed area 223. An additional, moveable spring 224 is provided having a barb 240 defined on the end thereof. Barb 240 has ramped edge 241 and straight edge 242 defining a recessed area behind barb 242. Connected to spring 224 is tab 270, accessible from outside of the outlet via opening 220. The recesses area 223 defined by prong 222 permits deflection of spring 224 into recess 223 during insertion and removal of the device from the outlet. All variations of the invention discussed with respect to other embodiments could be implemented with this embodiment as well. In addition, the device may be equipped with a prong (not shown) shaped to fit into the ground hole $A_g$ of the outlet. The ground prong may be solid or may be configured as discussed above with respect to rectangular prongs, having a recessed area 223 and an accompanying spring 224. In such a case, rectangular prongs 222 may be configured without spring 224.

As device 200 is inserted into the outlet, ramped end 241 of barb 240 deflects spring 224 into recess 223. Once barb 240 has cleared the rear surface of the outlet, spring 224 springs back into place and the wall of the outlet is contained within recess 242 by the straight edge of barb 240.

To remove the device, a force is applied to tab 270, deflecting spring 224 into recess 223, thereby releasing barb 240 from the rear surface of the outlet, at which time device 200 can be pulled from the outlet.

All devices discussed herein are contemplated to be made of an electrically non-conductive material such as plastic or polyethylene. The prongs defined on the rear of the bodies of the devices may be integrally molded with the body of the device or may be rigidly attached by various means including adhesive, screws or any other fastening means well known in the art. It is contemplated, however, that the prongs are rigidly connected to the rear of the body of the device and do not move with respect to the body of the device.

It will be understood that the particular method and device embodying the invention are shown by way of illustration and not as a limitation of the invention. In general, the invention is contemplated to encompass all variations of construction wherein a barbed spring structure defined as part of one or both of the rectangular prongs is utilized to engage the rear of surface of the outlet. Therefore, the principles and features of this invention may be employed in various and numerous embodiments without departing from the scope of the invention. It is understood by those skilled in the art that various changes in form, construction and detail may be made therein without departing from the spirit and scope of the invention, as defined by the appended claims.

I claim:

1. An electrical outlet safety cover device comprising:
   a. a body having a front face and a rear face;
   b. at least one prong rigidly attached to and extending from said rear face of said body, said at least one prong defining a tongue carrying a barb, said barb being biased by said tongue to engage an electrical outlet when said cover is inserted therein;

c. a generally rectangular-shaped structure having a first end attached to said rear face of said body and a second end spaced distal to said rear face of said body;

d. wherein said tongue, is defined by three slits in said rectangular-shaped structure, one of said slits being defined along said first end of said structure and two of said slits being defined near the lateral edges of said structure, said three slits being connected such that said tongue is attached to said structure only at said end of said structure distal to said body.

2. The device of claim 1 wherein said tongue is thinner in cross sectional area than the rest of said prong.

3. The device of claim 1 wherein said barb comprises:

a. one ramped side, said ramped side engaging said outlet as said device is inserted into said outlet, thus deflecting said tongue such that said barb fits through a rectangular slit in said outlet; and b. one straight side, said straight side engaging said outlet when said device is fully inserted into said outlet, thus preventing the removal of said device from said outlet.

4. The device of claim 1 further comprising one or more openings, defined in said body, through which an object may be inserted to deflect said tongue, such that said barb is disengaged from said outlet, thus enabling the removal of said device from said outlet.

5. The device of claim 1 comprising at least two prongs rigidly attached to said rear face of said body, at least one of which defines said tongue and barb therein.

6. The device of claim 4 wherein said object is a disengagement member attached to said tongue and extending through or accessible from one of said openings, such that applying a lateral force to said disengagement member causes said tongue to deflect such that said barb is disengaged from said outlet.

7. An electrical outlet safety cover device comprising:

a. a body having a front face and a rear face;

b. at least one prong rigidly attached to and extending from said rear face of said body, said at least one prong defining a tongue carrying a barb, said barb being biased by said tongue to engage an electrical outlet when said cover is inserted therein;

c. a generally rectangular-shaped structure, attached at a first end to said rear face of said body and a second end spaced distal to said rear face of said body;

d. wherein said tongue, is defined by two slits in said structure, said slits being defined near the lateral edges of said structure, such that said tongue is attached to said structure only at said first end of said structure and said second end of said structure.

8. The device of claim 7 wherein said tongue is thinner in cross sectional area than the rest of said prong.

9. The device of claim 7 wherein said barb comprises two ramped sides, one of said ramped sides engaging said outlet as said device is inserted into said outlet, and the other of said ramped sides engaging said outlet as said device is extracted from said outlet, said ramped surfaces causing said tongue to deflect such that said barb fits through a rectangular opening in said outlet.

10. The device of claim 9 comprising at least two prongs rigidly attached to said rear face of said body, at least one of which defines said tongue and barb therein.

11. An electrical outlet safety cover device comprising:

a. a body having a front face and a rear face; and b. two prongs attached to and extending from said rear face of said body;

c. wherein one of said prongs is generally "U" shaped, having one leg of said "U" shape being rigidly attached to said rear face of said body, and the other leg being moveable with respect to said rigidly fixed leg.

12. The device of claim 11 further comprising a first barb, defined on said moveable leg of said "U" shaped prong, said first barb comprising:

a. one ramped side, said ramped side engaging an outer surface of said outlet as said device is inserted into said outlet, thus deflecting said moveable leg such that said barb fits through a rectangular opening in said outlet; and b. one straight side, said straight side engaging said outlet when said device is fully inserted into said outlet, thus preventing the removal of said device from said outlet.

13. The device of claim 12 further comprising a first tab, rigidly connected to said moveable leg, said first tab extending outwardly from said body, such that a force applied to said first tab will cause said moveable leg to move toward said rigidly fixed leg, causing said barb to disengage from said outlet, thus enabling the removal of said device from said outlet.

14. The device of claim 13 wherein the other of said prongs is "U" shaped, having one leg of said "U" being rigidly attached to said rear face of said body, and the other leg being moveable with respect to said rigidly fixed leg, further comprising:

a second barb, defined on said moveable leg of said other prong;

a second tab, rigidly connected to said moveable leg of said other prong; and a connecting member disposed between and rigidly connected to said first and second tabs, such that a force applied to said connecting member will cause said both of said moveable legs to move simultaneously toward said rigidly fixed legs, causing said barbs to disengage from said outlet.

15. An electrical outlet safety cover comprising:

a. a body having a front face and a rear face;

b. one or more prongs rigidly extending from said rear face of said body, at least one of said prongs defining a recessed area therein along a portion of its length;

c. a spring member rigidly attached to said rear face of said body in close proximity to said prong;

d. said spring member being moveable with respect to said prong, such that said spring member can be deflected into said recessed area defined by said prong; and e. a barb defined on said spring member.

16. The device of claim 15 wherein said barb comprises:

a. one ramped side, said ramped side engaging an outer surface of said outlet as said device is inserted into said outlet, thus deflecting said spring member such that said barb fits through a rectangular opening in said outlet; and b. one straight side, said straight side engaging said outlet when said device is fully inserted into said outlet, thus preventing the removal of said device from said outlet.

17. The device of claim 16 further comprising a tab member rigidly connected to said spring member, such that a force applied to said tab will cause said spring member to move into said recessed area defined by said prong, causing said barb to disengage from said outlet, thus enabling the removal of said device from said outlet.

18. The device of claim 17 wherein two prongs define recessed areas, further comprising:

b. two spring members; and c. a connecting member disposed between rigidly connected tabs extending from said spring members such that a force applied to said connecting member will cause both of said spring members to move simultaneously into the recessed areas defined by their respective prongs, causing said barbs to disengage said outlet, thus enabling the removal of said device from said outlet.

19. An electrical outlet safety cover comprising:

a. a body having a front face and a rear face;

b. two prongs generally shaped to fit within rectangular openings defined in an electrical outlet, said prongs being rigidly attached to and extending from said rear face of said body, wherein at least one of said prongs defines a tongue carrying a barb biased by said tongue to engage said electrical outlet when said cover is inserted therein, thus preventing the removal of said device from said outlet; and c. a tab member, for deflecting said tongue to disengage said barb from said electrical outlet, thus enabling the removal of said cover from said outlet.

20. The device of claim 19 wherein one of said prongs is larger than the other such as to fit into a polarized electrical outlet.

21. The device of claim 20 further comprising a third prong shaped to fit into the ground hole of an electrical outlet, said third prong being rigidly attached to said rear face of said body.

22. The device of claim 19 wherein said device is composed entirely of an electrical insulator.

* * * * *